(12) United States Patent
Chen et al.

(10) Patent No.: US 7,355,116 B2
(45) Date of Patent: Apr. 8, 2008

(54) REMOVABLE POWER SUPPLY SYSTEM

(75) Inventors: Banks Chen, Taipei (TW); Chih-Ping Huang, Taipei (TW); Juei-Ching Hsiao, Taipei (TW)

(73) Assignee: Inventec Corporation (TW)

( * ) Notice: Subject to any disclaimer, the term of this patent is extended or adjusted under 35 U.S.C. 154(b) by 45 days.

(21) Appl. No.: 11/395,836

(22) Filed: Mar. 30, 2006

(65) Prior Publication Data

US 2007/0084634 A1 Apr. 19, 2007

(30) Foreign Application Priority Data

Oct. 14, 2005 (TW) .............................. 94217777 U

(51) Int. Cl.
*H02G 3/08* (2006.01)
*H02G 3/18* (2006.01)

(52) U.S. Cl. .................. 174/50; 174/651; 174/520; 174/559; 361/796; 361/752

(58) Field of Classification Search ................ 174/657, 174/50, 520, 59, 254, 550–563, 53, 54, 60, 174/64, 69, 651; 220/4.01, 4.02, 3.2–3.9; 361/724, 796, 725, 801, 759, 730, 686, 752; 439/61, 62, 65, 67, 87, 359, 52
See application file for complete search history.

(56) References Cited

U.S. PATENT DOCUMENTS

| | | | | |
|---|---|---|---|---|
| 4,556,270 A | * | 12/1985 | Schutzle et al. ............ | 439/359 |
| 5,587,881 A | * | 12/1996 | Wang .......................... | 361/730 |
| 5,808,867 A | * | 9/1998 | Wang .......................... | 361/725 |
| 5,877,938 A | * | 3/1999 | Hobbs et al. ................ | 361/724 |
| 6,392,872 B1 | * | 5/2002 | Doustou et al. ............ | 174/559 |
| 6,445,586 B1 | * | 9/2002 | Chou .......................... | 361/725 |
| 6,570,770 B1 | * | 5/2003 | Ross et al. .................. | 361/752 |
| 6,577,501 B2 | * | 6/2003 | Lin .............................. | 361/759 |
| 6,606,253 B2 | * | 8/2003 | Jackson et al. ............. | 361/796 |
| 6,667,887 B2 | * | 12/2003 | Sim et al. .................... | 361/725 |
| 7,200,004 B2 | * | 4/2007 | Chen et al. .................. | 361/686 |

* cited by examiner

*Primary Examiner*—Angel R. Estrada
(74) *Attorney, Agent, or Firm*—Peter F. Corless; Steven M. Jensen; Edwards Angell Palmer & Dodge LLP

(57) ABSTRACT

A removable power supply system is proposed, which includes a power supply and a power supply adapter. The power supply adapter is fastened and electrically connected to the power supply. The power supply is provided with a first electrical connection portion and a first fastening portion. The power supply adapter is provided with a second electrical connection portion electrically connected to the first electrical connection portion and a second fastening portion fastened to the first fastening portion. In so doing, not only are the power supply and the power supply adapter fastened together, but individual power supply adapters are independent of each other, thereby solving the drawbacks of the prior art.

9 Claims, 5 Drawing Sheets

REMOVABLE POWER SUPPLY SYSTEM

BACKGROUND OF THE INVENTION

1. Field of the Invention

The present invention relates generally to a power supply system, and more particularly, to a removable power supply system.

2. Description of Related Art

As the digital age draws on, computer plays an increasingly important part in human life. In addition to a central processing unit (CPU) capable of computing at high speed and enough RAM capacity, a computer with excellent performance must possess a power supply for supplying power to the computer itself steadily.

In order to enable a computer, especially an industrial computer or server used in a system working around the clock, to run for a long period of time, standby power supplies must be additionally installed to supply power to the computer steadily. Take a server as an example, in a situation where multiple power supplies are installed in the server to take turns to stand by, it is necessary to install inside the server an adapter equipped with a power-related flat cable; the input end of the adapter is electrically connected to multiple power supplies, whereas the output end of the adapter is electrically connected to a motherboard inside the server, thereby automatically switching to a fully functioning power supply for supplying power steadily.

FIG. 1 shows a conventional power supply system for use with a server. The power supply system comprises a power supply adapter set 1 and a power supply 2. The power supply adapter set 1 includes two power supply adapters 10, each having an electrical connection portion 101. The power supply 2 includes an electrical connection portion 20 electrically connected to one of the electrical connection portions 101. In general, each power supply adapter 10 is electrically connected to a power supply 2 (only one of the power supplies 2 is shown herein). Two power supply systems take turns to serve as a standby power supply. The electrical connection portion 20 of the power supply 2 is inserted into the power supply adapter set 1 through an opening at the rear of the server (not shown). At a normal operating state, only one of the power supply adapters 10 in the power supply adapter set 1 is employed to maintain the power required by the server, and the other power supply adapter 10 is at a standby state. Once a functioning power supply system breaks down, the power supply 2 must be removed and inspected.

However, once the conventional power supply system breaks down, what can be done is removing the power supply for inspection; failure of the power supply adapter 10 can be confirmed, only if an inspection shows that the power supply 2 is in good condition. The two power supply adapters 2 of the power supply system share the same casing, and each is electrically connected to a power supply 2, thus it is necessary to open the casing and shut down the system in order to repair the nonfunctioning power supply adapter 10. It always takes much time to do so. Also, the longer the server is idling, the throughput is compromised to a greater extent.

As mentioned above, in order to repair a power supply adapter, it is necessary to open the casing of the server and remove the power supply adapter, rather than concurrently remove the power supply adapter and the power supply from behind the server, for two reasons. First, the power supply adapter is installed inside the server. Second, the power supply adapter is coupled to a power supply by electrical connection only, rather than by any mechanical fastening mechanism. In a situation where a component, such as a motherboard, overlies a power supply adapter, or in another situation where a power supply adapter is partitioned into an upper compartment and a lower compartment, two problems arise. First, removal of a power supply adapter causes the server to idle. Second, an attempt to electrically connect a power supply adapter to a power supply anew may end up placing the power supply adapter in the wrong position or damaging an electrical connection portion. Hence, the aforesaid prior art may damage the related component when applied in a disassembly process, thus reducing its industrial applicability.

Accordingly, the problem to be solved here is to develop and fabricate a removable power supply system which is convenient to maintain, such that both the power supply adapter and the power supply may be simultaneously removed from or installed in the server, without compromising the operation of the system during maintenance.

SUMMARY OF THE INVENTION

In light of the drawbacks of the foregoing prior art, it is a primary objective of the present invention to provide a removable power supply system which is convenient to maintain.

Another objective of the present invention is to provide a removable power supply system whose operation remains unaffected during maintenance.

Yet another objective of the present invention is to provide a removable power supply system which is simple to assemble/disassemble.

In order to achieve the above and other objectives, the present invention discloses a removable power supply system comprising a power supply and a power supply adapter electrically connected, and fastened, to the power supply. The power supply is provided with a first electrical connection portion and a first fastening portion. The power supply adapter is provided with a second electrical connection portion electrically connected to the first electrical connection portion and a second fastening portion fastened to the first fastening portion.

Preferably, the first fastening portion, in which the first electrical connection portion is enveloped, includes an opening and coupling holes. The opening exposes the first electrical connection portion. The coupling holes, which can be threaded holes, enable the second fastening portion to be fastened. The second fastening portion, in which the second electrical connection portion is enveloped, includes an opening, installation holes, and fasteners. The opening exposes the second electrical connection portion. The installation holes positionally correspond to the coupling holes respectively. The fasteners, which can be headed bolts, positionally correspond to the coupling holes and the installation holes respectively. The power supply adapter is further provided with a third electrical connection portion disposed on the side opposite the second electrical connection portion and configured to be electrically connected to other devices.

According to the prior art, the only solution to a failure is to remove the power supply and, once an adapter failure is identified, the system has to be shut down before maintenance can be carried out, and in consequence the system becomes idle and throughput is compromised. By contrast, according to the present invention, a power supply adapter and a power supply are fastened together to form a self-contained power supply system, such that together they can be removed from or installed in a server. Unlike the prior art, the present invention makes maintenance convenient, enables system operation to remain unaffected during maintenance, and allows a power supply adapter to be easily removed. The present invention solves the drawbacks of the prior art—the complicated process of opening the casing or removing an obstructive component like a motherboard so as to perform the installation/uninstallation procedure.

According to the prior art, it is difficult to remove a power supply adapter and thus a user fails to precisely identify the condition of the power supply system. By contrast, according to the present invention, once a power failure happens, a power supply is removed along with a power supply adapter, so as to streamline the installation/uninstallation procedure and precisely identify the cause of failure.

As regards the removable power supply system of the present invention, the electrical connection portions are enveloped in fastening structures, and this brings two advantages. First, the electrical connection portions are spared damage which may otherwise occur whenever the electrical connection gets loosened in whole or in part while the power supply and the power supply adapter are being removed. Second, enveloped in the fastening structures, the electrical connection portions are protected by the fastening structures (i.e. not subjected to excessive stress) particularly while the power supply and the power supply adapter are being installed in the server.

Accordingly, the present invention provides a removable power supply system which is easy to repair and maintain, so as to make the system operation remain unaffected during maintenance, and streamline the installation/uninstallation procedure of a power supply adapter. The present invention enables an examination to be swiftly carried out to deal with a failure, and protects the related components from being damaged during the installation/uninstallation procedure, thus the present invention is highly industrial applicable.

BRIEF DESCRIPTION OF DRAWINGS

The present invention can be more fully understood by reading the following detailed description of the preferred embodiment, with reference made to the accompanying drawings, wherein.

DETAILED DESCRIPTION OF PREFERRED EMBODIMENTS

The following specific embodiments are provided to illustrate the present invention. Others skilled in the art will readily understand other advantages and functions of the present invention in accordance with the contents disclosed in this specification. The present invention can also be performed or applied by other different embodiments. Various modifications and changes based on different viewpoints and applications can be made in the details of the specification without departing from the spirit of the present invention.

It should be noted that the drawings are simplified schematic diagrams and only show components relating to the present invention. In practice, the layout of the components may be far more intricate.

Figure 1:
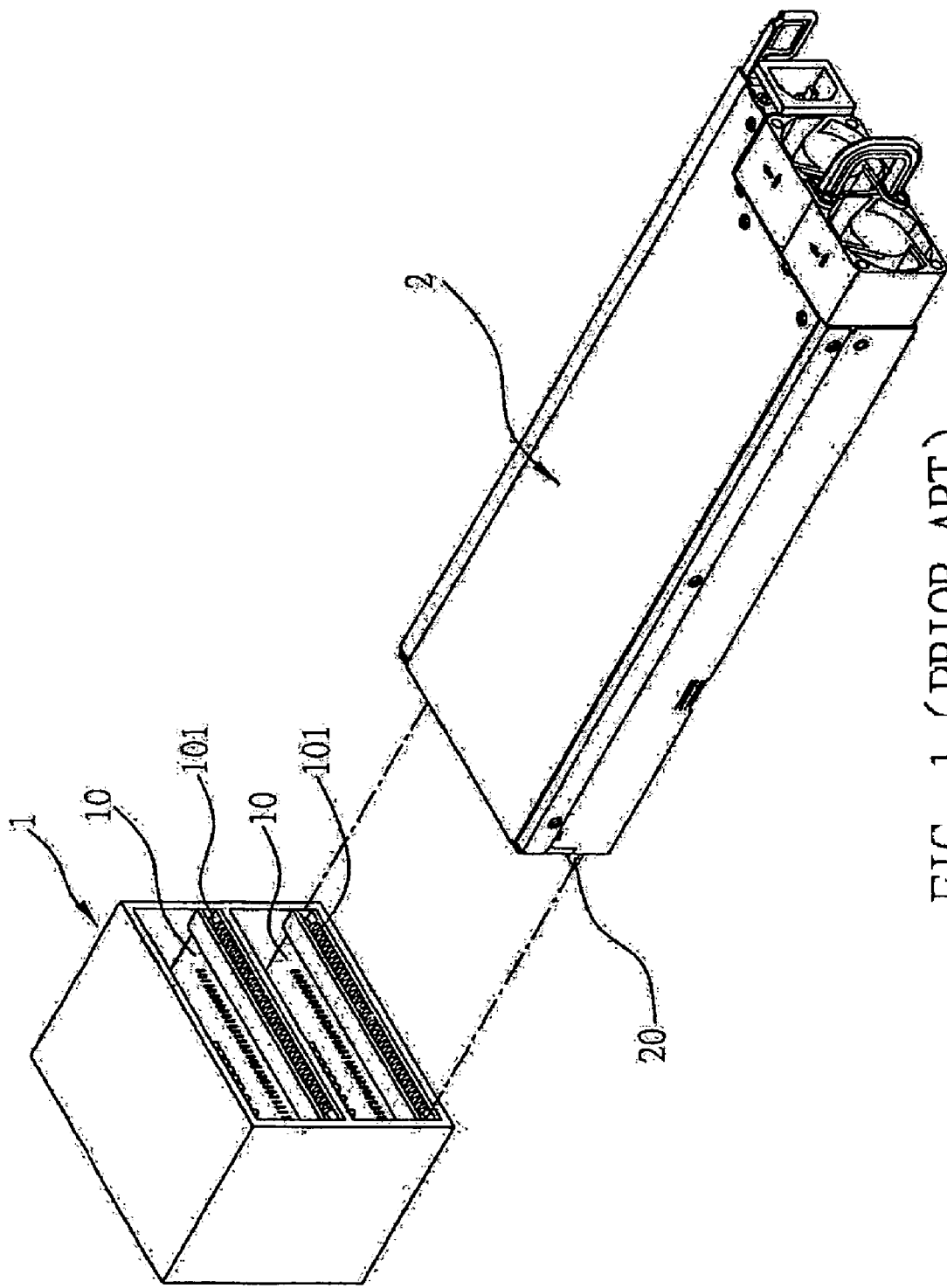
FIG. 1 shows a schematic view of a conventional power supply system.
Figure 2:
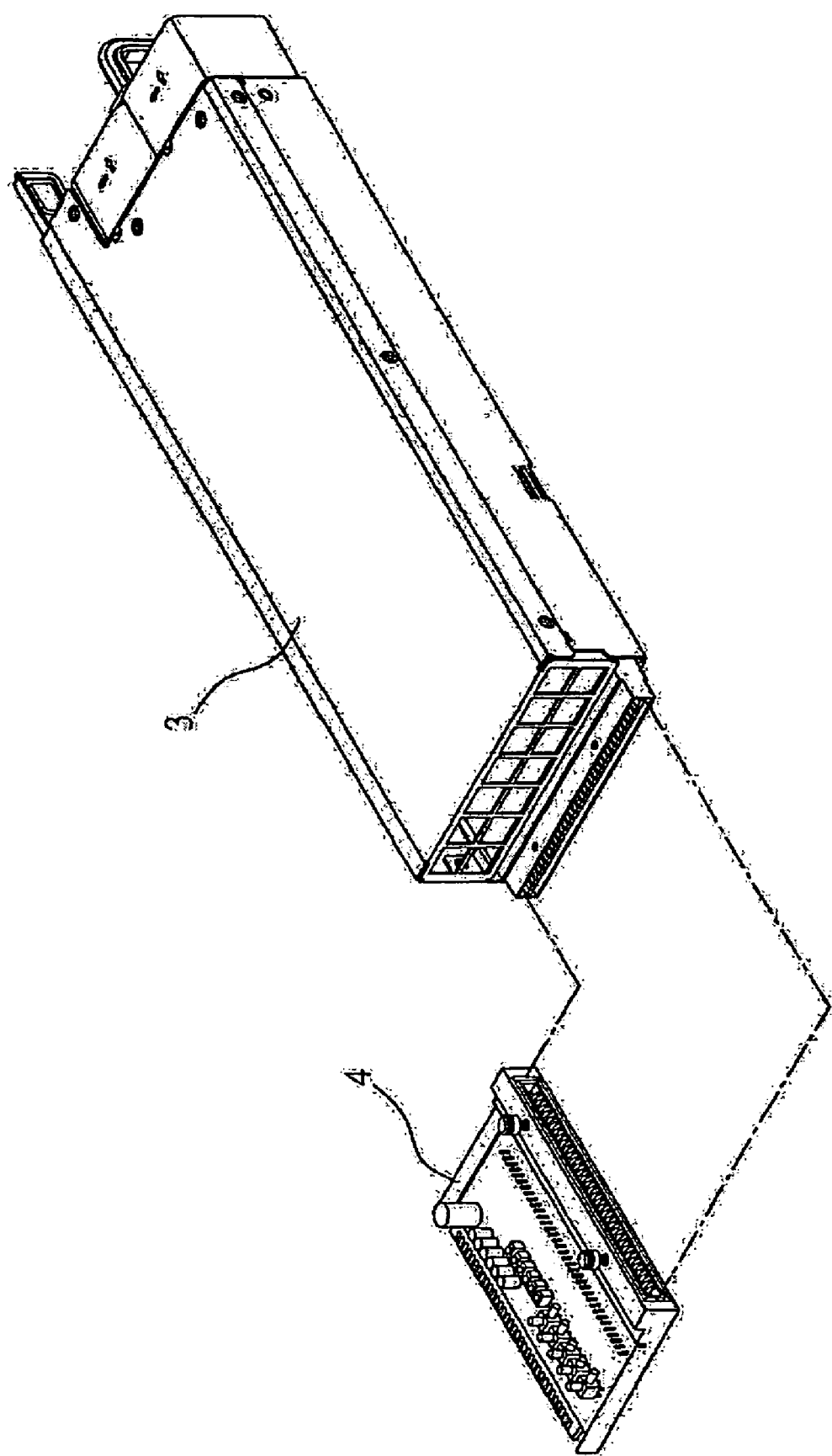
FIG. 2 shows a schematic view of a preferred embodiment of the present invention.

FIG. 2 shows a schematic view of a preferred embodiment for a removable power supply system of the present invention. As shown in FIG. 2, the removable power supply system of this embodiment comprises a power supply 3 and a power supply adapter 4.

Figure 3:
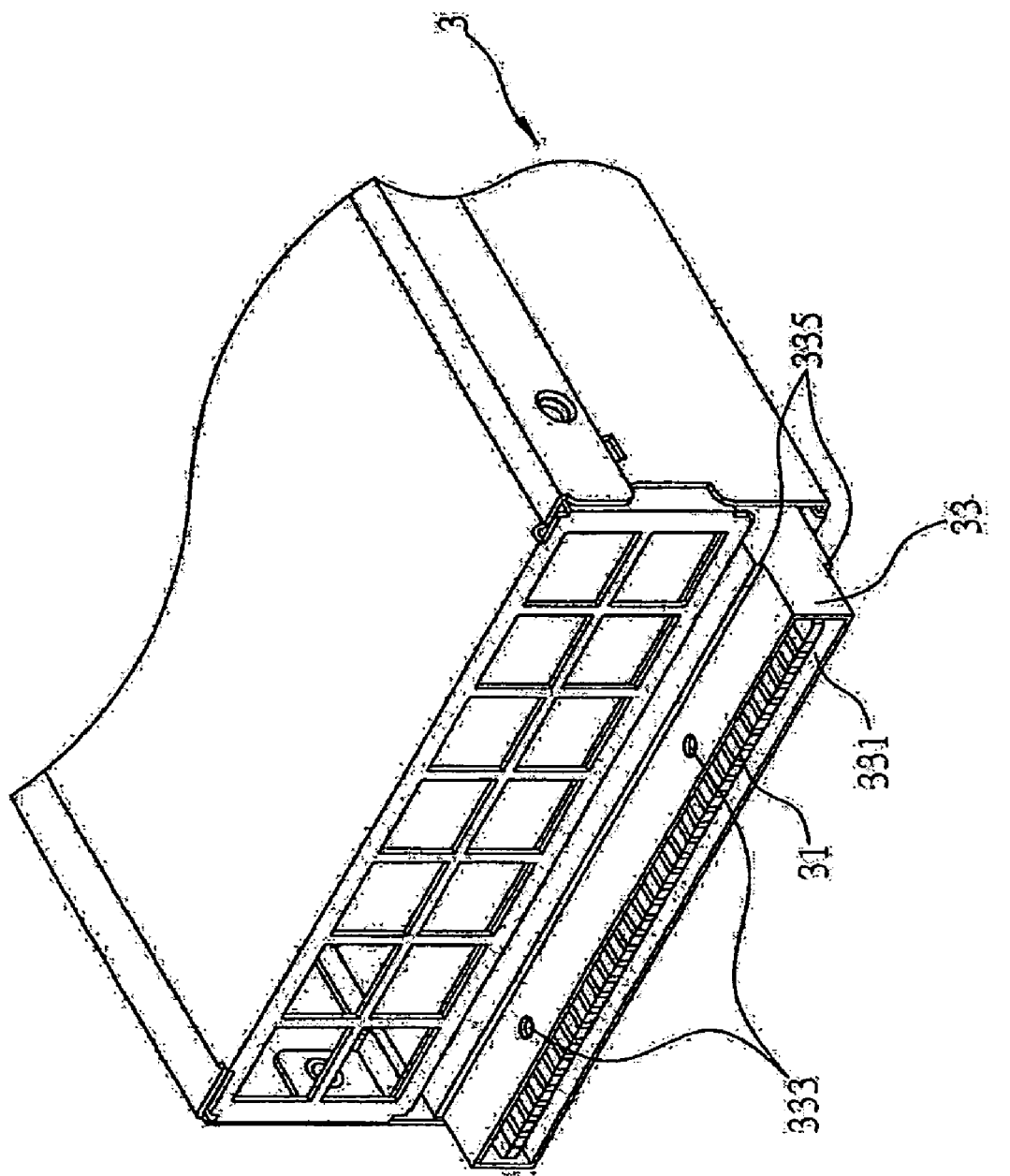
FIG. 3 shows an exploded view of a power supply adapter of the preferred embodiment.

As shown in FIG. 3, the power supply 3 comprises a first electrical connection portion 31 and a first fastening portion 33, wherein the first electrical connection portion 31 is enveloped in the first fastening portion 33. The first electrical connection portion 31 can be a gold finger. The first fastening portion 33 looks like a frame and is provided with an opening 331 and a pair of coupling holes 333. The opening 331 exposes the first electrical connection portion 31. The coupling holes 333 can be a pair of threaded holes. The first fastening portion 33 further comprises stop flanges 335 configured to determine the position most suitable for electrical connection and fastening.

Figure 4:
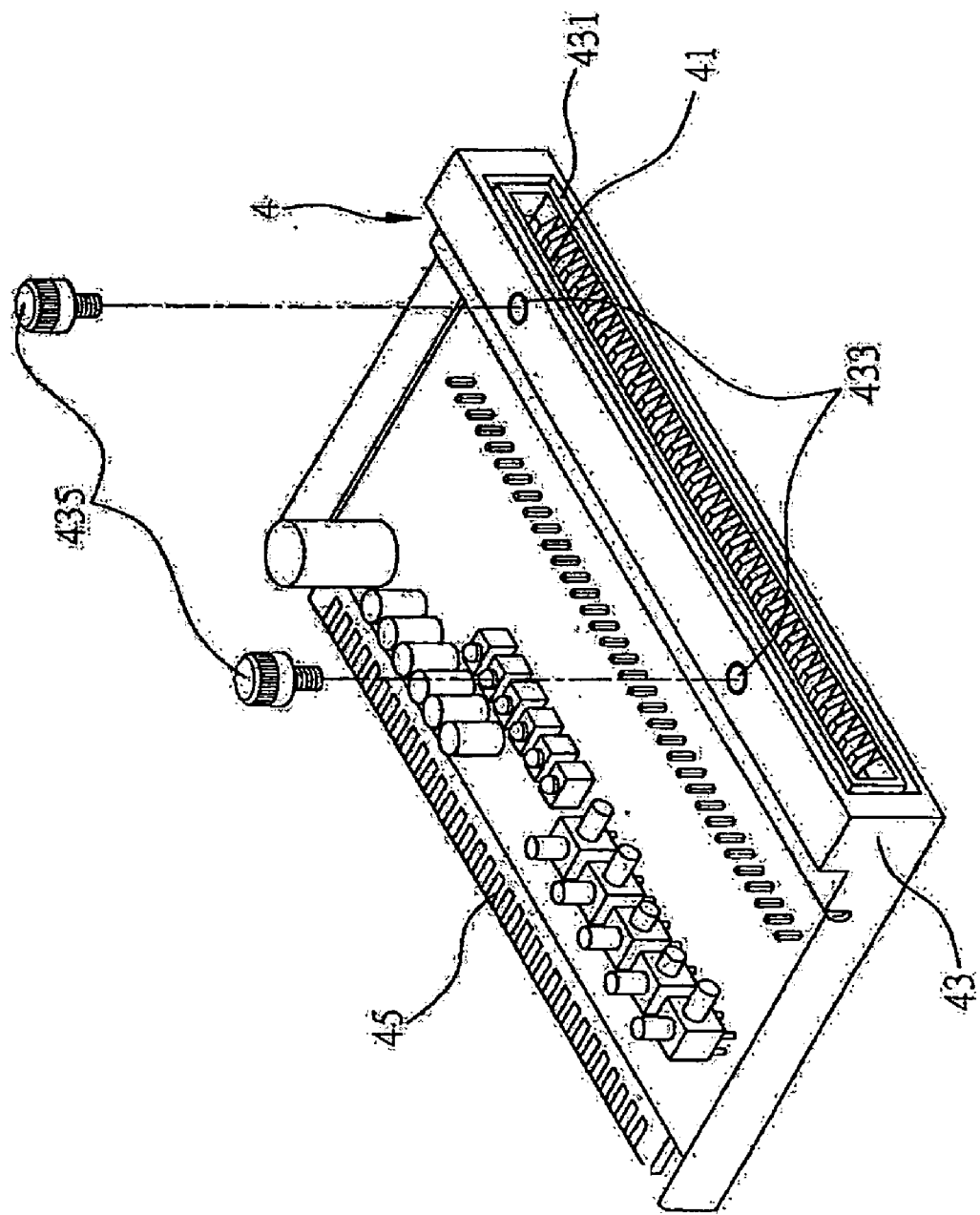
FIG. 4 shows an exploded view of a power supply of the preferred embodiment.

As shown in FIG. 4, the power supply adapter 4 comprises a second electrical connection portion 41 electrically connected to the first electrical connection portion 31 and a second fastening portion 43 enveloping the second electrical connection portion 41. The second electrical connection portion 41 can be a gold finger as well. The second fastening portion 43 looks like a frame and is provided with an opening 431, a pair of installation holes 433, and a pair of fasteners 435. The opening 431 exposes the second electrical connection portion 41. The pair of installation holes 433 positionally correspond to the coupling holes 333. The pair of fasteners 435 match both the installation holes 433 and the coupling holes 333. The profile of the opening 431 matches the first fastening portion 33. It should be noted that neither the structure of the first electrical connection portion 31 nor that of the second electrical connection portion 41 is limited to what is described in this embodiment; instead, there can be variations in the electrical connection.

Upon connection of the first. electrical connection portion 31 with the second electrical connection portion 41, the fasteners 435 penetrate the installation holes 433 before being fastened to the coupling holes 333, such that the first fastening portion 33 and the second fastening portion 43 are fastened together. In this embodiment, the fasteners 435 can be bolts, such as headed bolts. However, in other embodiments, the fasteners 435 can also be equivalent elements which can fasten the first fastening portion 33 and the second fastening portion 43 together, thus the fasteners 435 are not limited to what is described in this embodiment.

The power supply adapter 4 further comprises a third electrical connection portion 45 for being electrically connected to a substrate equipped with a power-related flat cable and disposed inside a server or any related equivalent device (none is shown), for example.

Figure 5:
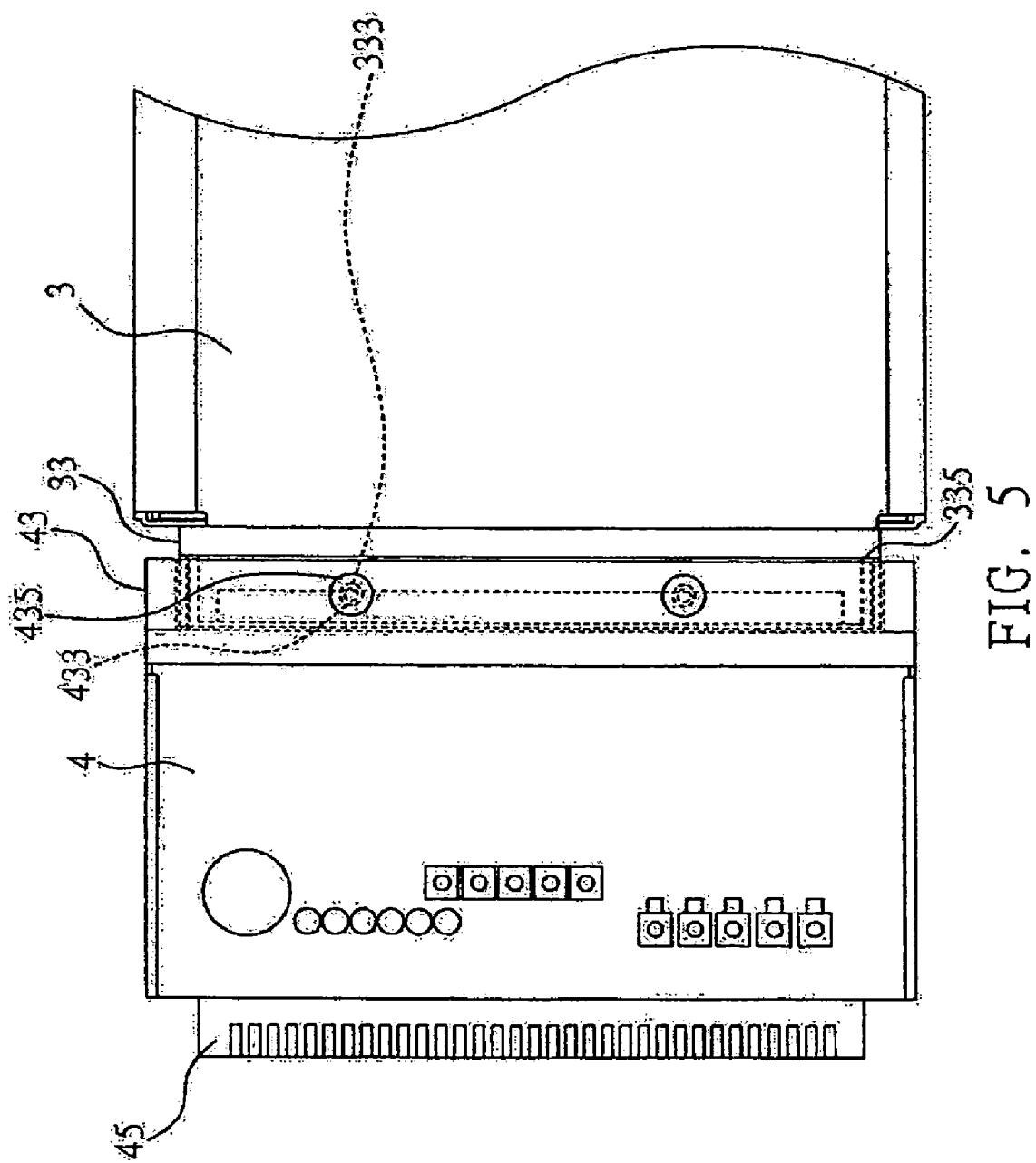
FIG. 5 shows a schematic view of the preferred embodiment for the fastening of the removable power supply system of the present invention.

As shown in FIG. 5, the first step to install the removable power supply system of the present invention involves putting the second fastening portion 43 close to the first fastening portion 33. Since the opening 431 matches the first fastening portion 33 in terms of profile, the first fastening portion 33 fits the second fastening portion 43 well, whereas the first electrical connection portion 31 gets electrically connected to the second electrical connection portion 41. Once the second fastening portion 43 is pushed until it is stopped by the stop flanges 335, the installation holes 433 will be pointed at the coupling holes 333, and at that point, the fasteners 435 can be fastened in the coupling holes 333, thereby fastening the first fastening portion 33 to the second fastening portion 43.

After the first fastening portion 33 is fastened to the second fastening portion 43, the power supply adapter 4 can be firmly coupled to the power supply 3. Hence, after the power supply system is installed in a servo device, such as a server (not shown), both the power supply 3 and the power supply adapter 4. can be concurrently withdrawn from or placed in a predetermined position, and the power supply adapter 4 can be electrically connected to a relate device inside the server through the third electrical connection portion 45.

In order to disconnect the power supply adapter 4 from the power supply 3, a user merely needs to disenable the state of coupling between the first fastening portion 33 and the second fastening portion 43. In this embodiment, a user can fasten or unfasten the fasteners 435, such as bolts, manually so as to carry out the installation/uninstallation procedure smoothly.

It should be noted that although in this embodiment the power supply adapter 4 is coupled to the power supply 3 by insertion and locking, any person ordinarily skilled in the art will readily understand that a retainer, a pin and any other equivalent fastening design are also applicable to the present invention; hence, what is described in this embodiment is open-ended, as this embodiment can be implemented to the full by fastening the power supply 3 and the power supply adapter 4 together to form an equivalent structure which can be removed from and placed in the server concurrently, and a modified structure as such is always equivalent to the old one and quite understandable. Hence, no verbosity is required herein.

Unlike the prior art, the present invention turns a conventional power supply adapter set with multiple power supply adapters into a design of power supply adapters independent of each other and electrically connected to a power supply, with a view to supplying power. In so doing, even if a power supply breaks down, power will be supplied by another one, and the non-functioning part can be repaired individually or changed before being reinstalled in the server to serve as a standby power supply, without affecting the system operation. Furthermore, with the removable power supply system of the present invention, a power supply adapter can be easily removed, thereby solving the drawbacks of the prior art—the complicated process of opening the casing or removing an obstructive component like a motherboard so as to perform the installation/uninstallation procedure.

According to the prior art, it is difficult to remove a power supply adapter and thus a user fails to precisely identify the condition of the power supply system. By contrast, according to the present invention, once a power failure happens, a power supply is removed along with a power supply adapter, so as to promptly and precisely identify the cause of failure, and restore the system. Owing to the aforesaid characteristics, a servo device adopting the present invention merely needs to have two power systems which take turns to serve as a standby power supply, thereby minimizing the internal space of the server.

As regards the removable power supply system of the present invention, fastening structures are disposed around the electrical connection portions, and this brings three advantages. First, the electrical connection portions are spared damage which may otherwise occur whenever the electrical connection gets loosened in whole or in part while the power supply and the power supply adapter are being removed from the server. Second, enveloped in the fastening structures, the electrical connection portions are spared damage which may otherwise arise from moment of force induced by an external factor, such as friction, while the power supply and the power supply adapter are being removed from the server. Thirdly, during installation, the firm fastening structures give protection to the electrical connection portions as well and allow a user to apply a force outside the server and electrically connect a power supply adapter to the server readily.

Accordingly, the present invention provides a removable power supply system which is easy to repair and maintain, so as to streamline the installation/uninstallation procedure of a power supply adapter, and enable an examination to be swiftly carried out to deal with a failure. And further, with the fastening structures between a power supply and a power supply adapter, the power supply adapter and the power supply are firmly fastened together, thereby protecting the electrical connection portions from being damaged during the installation/uninstallation procedure.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A removable power supply system, comprising:
a power supply having a first electrical connection portion and a first fastening portion, wherein the first fastening portion comprises an opening and coupling holes; and
a power supply adapter having a second electrical connection portion and a second fastening portion, wherein the second electrical connection portion is connected to the first electrical connection portion, and the second fastening portion is fastened to the first fastening portion, wherein the second fastening portion comprises an opening, installation holes, and fasteners.

2. The removable power supply system as recited in claim 1, wherein the first electrical connection portion is enveloped in the first fastening portion.

3. The removable power supply system as recited in claim 1, wherein the opening of the first fastening portion exposes the first electrical connection portion, and the coupling holes fasten the second fastening portion in place.

4. The removable power supply system as recited in claim 3, wherein the coupling holes are threaded holes.

5. The removable power supply system as recited in claim 1, wherein the first fastening portion further comprises stop flanges.

6. The removable power supply system as recited in claim 1, wherein the second electrical connection portion is enveloped in the second fastening portion.

7. The removable power supply system as recited in claim 3, the opening of the second fastening portion exposing the second electrical connection portion, the installation holes positionally corresponding to the coupling holes, the fasteners matching both the installation holes and the coupling holes.

8. The removable power supply system as recited in claim 1, wherein the fasteners are headed bolts.

9. The removable power supply system as recited in claim 1, wherein the power supply adapter further comprises a third electrical connection portion.

* * * * *